US012434475B2

(12) United States Patent
Maruyama

(10) Patent No.: US 12,434,475 B2

(45) Date of Patent: Oct. 7, 2025

(54) LIQUID DISCHARGE HEAD, LIQUID DISCHARGE APPARATUS, AND METHOD FOR MANUFACTURING LIQUID DISCHARGE HEAD

(71) Applicant: CANON KABUSHIKI KAISHA, Tokyo (JP)

(72) Inventor: Ayako Maruyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 176 days.

(21) Appl. No.: 18/362,407

(22) Filed: Jul. 31, 2023

(65) Prior Publication Data

US 2024/0042762 A1 Feb. 8, 2024

(30) Foreign Application Priority Data

Aug. 5, 2022 (JP) ................................ 2022-125153
May 22, 2023 (JP) ................................ 2023-083720

(51) Int. Cl.
*B41J 2/14* (2006.01)

(52) U.S. Cl.
CPC ....... *B41J 2/14233* (2013.01); *B41J 2/14201* (2013.01); *B41J 2002/14241* (2013.01); *B41J 2002/1425* (2013.01); *B41J 2202/11* (2013.01)

(58) Field of Classification Search
CPC ................ B41J 2/14233; B41J 2/14201; B41J 2002/14241; B41J 2002/1425; B41J 2202/11
See application file for complete search history.

(56) References Cited

U.S. PATENT DOCUMENTS 7,591,544 B2 * 9/2009 Shimada .............. B41J 2/14233 347/68
9,937,716 B2 * 4/2018 Mikoshiba ........... B41J 2/14209

FOREIGN PATENT DOCUMENTS

JP 2004209874 A 7/2004
JP 2019111738 A 7/2019

* cited by examiner

*Primary Examiner* — Geoffrey S Mruk
(74) *Attorney, Agent, or Firm* — Canon U.S.A., Inc. IP Division

(57) ABSTRACT

A liquid discharge head includes a discharge port to discharge a liquid, and a liquid chamber to communicate with the discharge port, and further includes a vibrating plate, and a piezoelectric element. The vibrating plate is disposed on a surface of the liquid chamber on a side facing a surface communicating with the discharge port, and includes a plurality of layers stacked in a layered structure. The piezoelectric element is disposed on a second surface of the vibrating plate being a back surface of a first surface of the vibrating plate in contact with the liquid chamber. The vibrating plate has a recessed portion surrounded by a bottom surface and four lateral surfaces intersecting with the bottom surface on the first surface. The recessed portion penetrates through a first layer having the first surface among the plurality of layers of the vibrating plates.

17 Claims, 9 Drawing Sheets

LIQUID DISCHARGE HEAD, LIQUID DISCHARGE APPARATUS, AND METHOD FOR MANUFACTURING LIQUID DISCHARGE HEAD

BACKGROUND

Field

The present disclosure relates to a liquid discharge head, a method for manufacturing the liquid discharge head, and a liquid discharge apparatus.

Description of the Related Art

In liquid discharge heads of liquid discharge apparatuses such as an inkjet recording apparatus, a mechanism is known that uses a piezoelectric element to discharge a liquid. The mechanism includes a vibrating plate as a part of a liquid chamber for storing a liquid. When the piezoelectric element is applied with a voltage, the vibrating plate is deformed, the liquid chamber is contracted, and the liquid is discharged from discharge ports formed at one end of the liquid chamber.

In recent years, a liquid discharge head having densely arranged discharge ports has been demanded due to an increase in the image definition and recording speed. In this case, since the liquid chamber has a small inner volume, the vibrating plate needs to be largely displaced to obtain a predetermined discharge amount.

Japanese Patent Application Laid-Open No. 2019-111738 discusses a liquid discharge head including a substrate with a liquid chamber formed thereon, a vibrating plate as a part of the liquid chamber, and a piezoelectric element formed on the vibrating plate. The vibrating plate, on a liquid chamber side thereof, is provided with a recessed portion that overlaps with the liquid chamber in a planar view and is wider than the liquid chamber. Because the vibrating plate is thin in a region overlapping with the liquid chamber in the planar view, the vibrating plate is largely deformed in an out-of-plane direction during voltage application to the piezoelectric element. With the liquid discharge head discussed in Japanese Patent Application Laid-Open No. 2019-111738, a fixed end when the vibrating plate is deformed in the out-of-plane direction is a bonding portion of a wall of the recessed portion of the vibrating plate and the substrate with the liquid chamber formed thereon. In this case, a deformation amount of the vibrating plate in the out-of-plane direction during the voltage application to the piezoelectric element (inner volume change amount) increases. Meanwhile, a deformation amount (compliance) of the vibrating plate by pressure reception from the liquid in the liquid chamber also increases. If the compliance increases, a force generated in an in-plane direction cannot be properly converted into a force in the out-of-plane direction of the vibrating plate by the piezoelectric element, and thus energy conversion efficiency of the vibrating plate may be degraded.

Japanese Patent Application Laid-Open No. 2004-209874 discusses a liquid discharge head including a recessed portion having a portion smoothly formed with a predetermined curvature from a substantially flat portion substantially at the center in a region overlapping with a liquid chamber in a planar view. On the vibrating plate, the recessed portion is formed only in the region overlapping with the liquid chamber in the planar view, and no recessed portion exists at a position where lateral surfaces of the liquid chamber and the vibrating plate come into contact with each other. This configuration suppresses an increase in the compliance in comparison with the configuration discussed in Japanese Patent Application Laid-Open No. 2019-111738.

SUMMARY

The present disclosure is directed to providing a liquid discharge head capable of suppressing both an increase in the deformation amount and an increase in the compliance of the vibrating plate to improve the energy conversion efficiency of the vibrating plate, a method for manufacturing the liquid discharge head, and a liquid discharge apparatus.

According to an aspect of the present disclosure, a liquid discharge head includes a discharge port configured to discharge a liquid, a liquid chamber configured to communicate with the discharge port, a vibrating plate disposed on a surface of the liquid chamber on a side facing a surface communicating with the discharge port, and including a plurality of layers stacked in a layered structure, and a piezoelectric element disposed on a second surface of the vibrating plate being a back surface of a first surface of the vibrating plate in contact with the liquid chamber, wherein the vibrating plate has a recessed portion surrounded by a bottom surface and four lateral surfaces intersecting with the bottom surface on the first surface, and wherein the recessed portion penetrates through a first layer having the first surface among the plurality of layers of the vibrating plates.

Further features of the present disclosure will become apparent from the following description of exemplary embodiments with reference to the attached drawings.

DESCRIPTION OF THE EMBODIMENTS

Exemplary embodiments of the present disclosure will be described below. The exemplary embodiments will be described below centering on an inkjet head that discharges ink as a liquid, as a type of liquid discharge head. However, the present disclosure is not limited to these exemplary embodiments.

Figure 1A:
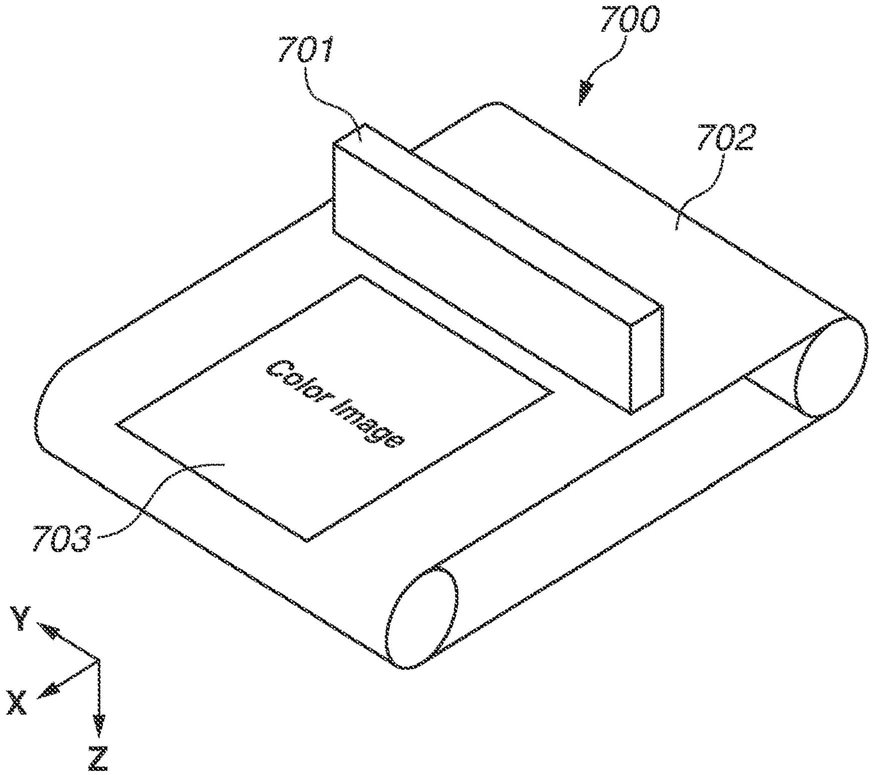
FIG. 1A is a schematic view illustrating an example of an inkjet recording apparatus of the present disclosure.
Figure 1B:
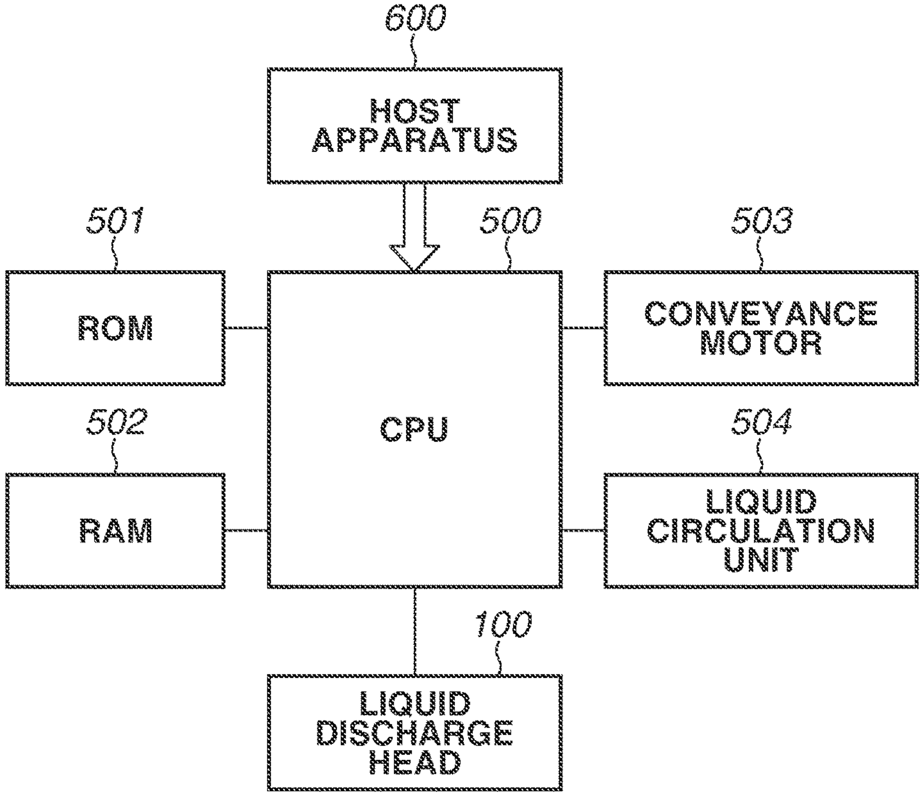
FIG. 1B is a control block diagram.

FIGS. 1A and 1B are a schematic view and a block diagram, respectively, illustrating an example of an inkjet recording apparatus 700 (hereinafter also referred to as an apparatus 700) of the present disclosure. As illustrated in FIG. 1A, the inkjet recording apparatus 700 according to the present exemplary embodiment is an example of the liquid discharge apparatus of the present disclosure and includes a recording unit 701 and a conveyance unit 702. A recording medium 703 such as a sheet is placed on the conveyance unit 702 and conveyed under the recording unit 701 in an X direction at a predetermined speed. The recording unit 701 includes a liquid discharge head 100 (described below), and a liquid circulation unit 504. Discharge ports for discharging ink drops in a Z direction are arranged at predetermined pitches in a Y direction. As illustrated in FIG. 1B, the entire inkjet recording apparatus 700 is controlled by a central processing unit (CPU) 500 that uses a random-access memory (RAM) 502 as a work area based on a program stored in a read only memory (ROM) 501. For example, the CPU 500 performs, on image data received from an externally connected host apparatus 600, predetermined image processing based on programs and parameters stored in the ROM 501 to generate ejection data based on which the liquid discharge head 100 can discharge ink. Then, the CPU 500 drives the liquid discharge head 100 based on the ejection data to discharge ink at a predetermined frequency. During an ejection operation by the liquid discharge head 100, the CPU 500 drives a conveyance motor 503 to convey the recording medium 703 in the X direction at a speed corresponding to the ejection frequency. Accordingly, an image based on the image data received from the host apparatus 600 is recorded on the recording medium 703. The liquid circulation unit 504 circulates and supplies a liquid (ink) to the liquid discharge head 100. The liquid circulation unit 504 controls an entire ink circulation system including a pressure control unit and a switching mechanism, under the control of the CPU 500.

Figure 2:
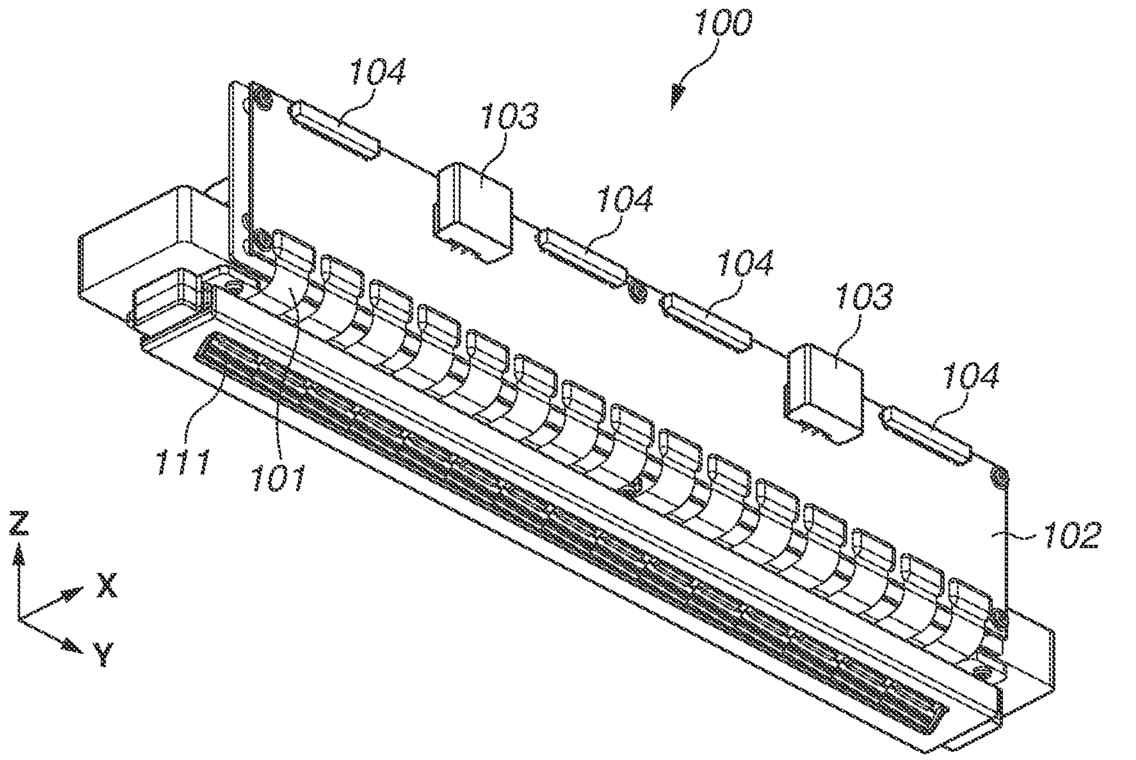
FIG. 2 is a perspective view illustrating an example of a liquid discharge head of the present disclosure.

FIG. 2 is a perspective view illustrating an example of the liquid discharge head 100 according to the present exemplary embodiment. The liquid discharge head 100 according to the present exemplary embodiment includes a piezoelectric device 111, an electrical wiring substrate 102 electrically connected with the piezoelectric device 111 via a flexible wiring substrate 101, and a power supply terminal 103 and a signal input terminal 104 for controlling the ink (liquid) discharge. As a method for supplying ink to the liquid discharge head 100, a method of supplying ink to the inside of the liquid discharge head 100 from one ink tank by capillary action or by using a pump can be used.

As another method for supplying ink to the liquid discharge head 100, a method of supplying ink to the liquid discharge head 100 by causing the ink to flow from one ink tank to the other ink tank disposed upstream and downstream on an ink supply path, respectively, to the liquid discharge head 100.

The liquid discharge head 100 according to the present exemplary embodiment illustrated in FIG. 2 is a long full-line type head having a plurality of piezoelectric devices 111 each having a plurality of densely arranged discharge ports 20 (described below). However, the liquid discharge head 100 of the present disclosure may be a serial scan type head having a head width smaller than a width of the recording medium 703.

Figure 3A:
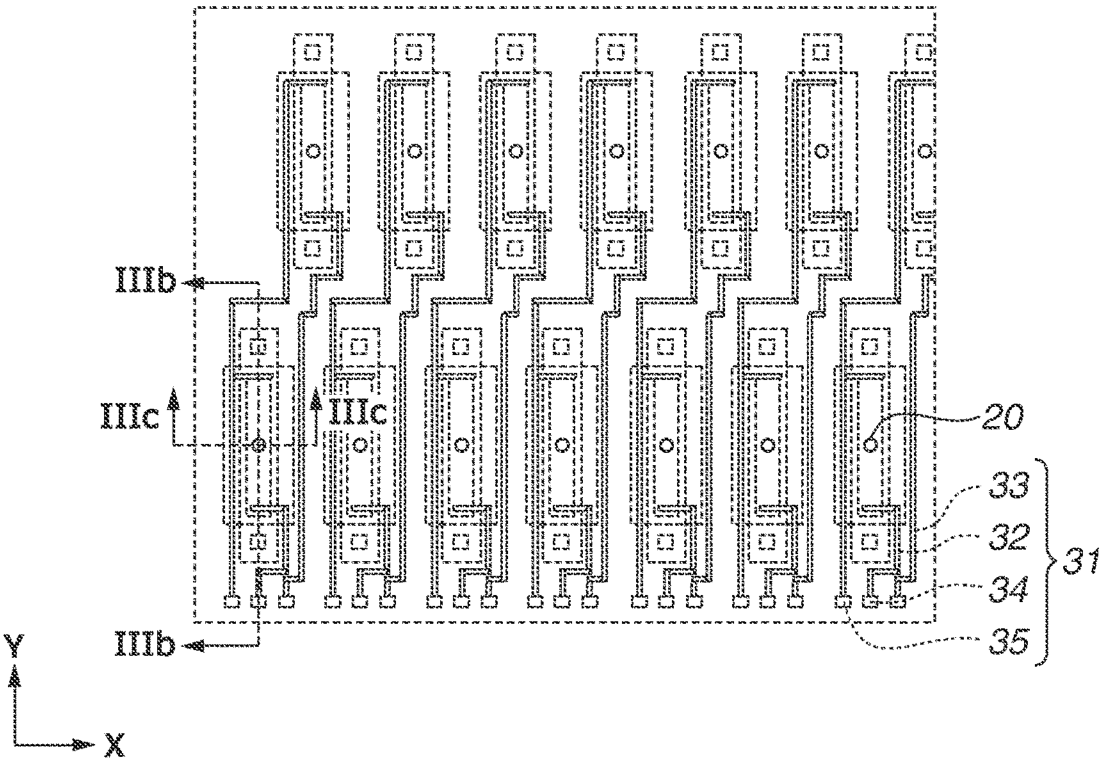
FIG. 3A is a plan view illustrating an example of the liquid discharge head of the present disclosure.
Figure 3B:
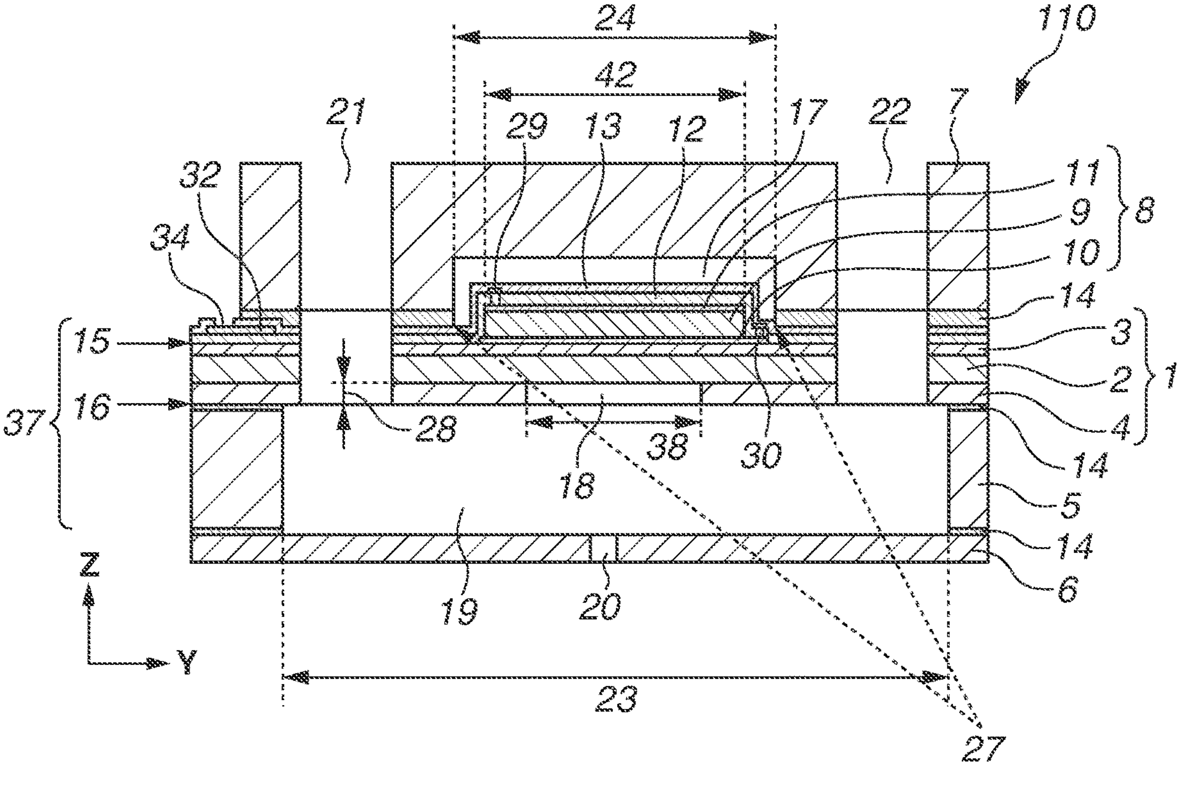
FIG. 3B is a cross-sectional view taken along a line IIIb-IIIb of FIG. 3A.
Figure 3C:
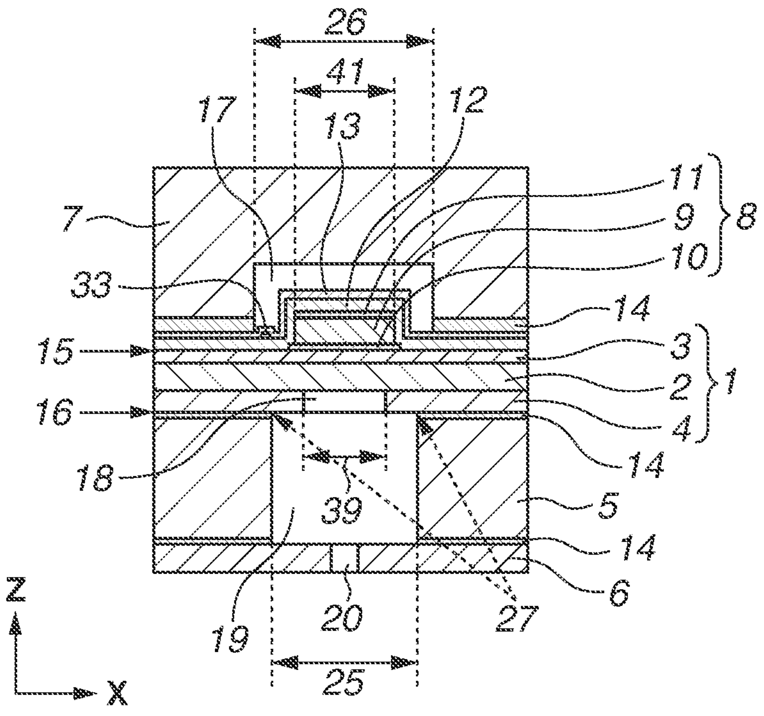
FIG. 3C is a cross-sectional view taken along a line IIIc-IIIc of FIG. 3A.

FIG. 3A is a plan view illustrating an enlarged part of the piezoelectric device 111 included in the liquid discharge head 100, FIG. 3B is a cross-sectional view taken along a line IIIb-IIIb of FIG. 3A, and FIG. 3C is a cross-sectional view taken along a line IIIc-IIIc of FIG. 3A.

FIG. 3A is the plan view illustrating the piezoelectric device 111 viewed from the side of the discharge ports 20. Broken lines in FIG. 3A indicate parts of an internal structure invisible from the side of the discharge ports 20. In FIG. 3A, the discharge ports 20, and liquid chambers 19 each having a substantially rectangular parallelepiped shape corresponding to the discharge ports 20 are arranged in the shorter side direction (X direction) of the liquid chambers 19 with the longer sides thereof aligned side by side. The "substantially rectangular parallelepiped shape" in the present specification refers to a rectangular parallelepiped shape having round corners. The shape of each liquid chamber 19 is not limited to a substantially rectangular parallelepiped shape. In the present exemplary embodiment, eight columns (discharge port columns) are arranged at a pitch of 1,000 μm in the Y direction, and each column has 120 discharge ports 20 arranged at a pitch of 150 dots per inch (dpi), i.e., 169.3 μm, in the X direction. The piezoelectric device 111 having the densely arranged discharge ports 20 is provided with the adjacent discharge port columns arranged so that the discharge ports 20 are shifted by 1,200 dpi (21.2 μm) in the X direction. The arrangement of the discharge ports 20 is not limited to the configuration illustrated in FIG. 3A.

A plurality of discharge elements 110 constituting the piezoelectric device 111 will be described with reference to FIGS. 3B and 3C. A discharge element 110 is a liquid discharge unit including a piezoelectric element, a vibrating plate, a liquid chamber, and a discharge port. The discharge element 110 includes a vibrating plate 1, a piezoelectric element 8 disposed on a second surface 15 of the vibrating plate 1, a liquid chamber substrate 5 connected with a first surface 16 of the vibrating plate 1 as the back surface of the second surface 15 and provided with the liquid chamber 19, a discharge port substrate 6 connected with the surface of the liquid chamber substrate 5 opposite to the side of the vibrating plate 1 and provided with a discharge port 20, and a flow path substrate 7 connected with the second surface 15 of the vibrating plate 1 so that the piezoelectric element 8 is surrounded by a space 17. In other words, the discharge element 110 has a structure in which the discharge port substrate 6, the liquid chamber substrate 5, the vibrating plate 1, and the flow path substrate 7 are stacked in layers in this order from the side of the discharge port 20. The liquid chamber 19 communicates with the discharge port 20, and the vibrating plate 1 is disposed on the surface opposite to the surface where the discharge port 20 of the liquid chamber 19 is arranged. Interfaces of the flow path substrate 7, the vibrating plate 1, the liquid chamber substrate 5, and the discharge port substrate 6 are bonded with an adhesive 14.

The flow path substrate 7 is provided with a supply port 21 for supplying a liquid to the liquid chamber 19, and a discharge port 22 for discharging the liquid from the liquid chamber 19. In FIG. 3B, the supply port 21 and the discharge port 22 are arranged at both ends in a longer side direction of the piezoelectric element 8. Thus, as illustrated in FIG. 3B, a liquid chamber length 23 in a longer side direction (Y direction) of the liquid chamber 19 is larger than a length 24 of the space 17 surrounding the piezoelectric element 8. On the other hand, as illustrated in FIG. 3C, a liquid chamber width 25 is smaller than a width 26 of the space 17 surrounding the piezoelectric element 8 in a shorter side direction (X direction) of the liquid chamber 19. A portion where the liquid chamber substrate 5 connects with the first surface 16 of the vibrating plate 1 in the liquid chamber 19 and a portion where the flow path substrate 7 connects with the second surface 15 of the vibrating plate 1 in the space 17 are fixed ends 27 when the vibrating plate 1 vibrates.

The vibrating plate 1 may have a layered structure in which a substrate 2 is sandwiched between a first insulating film 3 and a second insulating film 4. If the substrate 2 is a conductive substrate such as a silicon substrate (Si substrate), desirably, the vibrating plate 1 is provided with the first insulating film 3 on the side of the second surface 15 to maintain insulation between the vibrating plate 1 and the piezoelectric element 8. In consideration that the liquid chamber 19 formed on the first surface 16 of the vibrating plate 1 is exposed to liquid, such as water, and ambient air, desirably, the vibrating plate 1 is provided with the second insulating film 4 on the side of the first surface 16 to maintain insulation of the substrate 2. The vibrating plate 1 may be formed of only an insulating substrate, such as glass and resin, or may be formed of a plurality of substrates or films. In the present exemplary embodiment, the substrate 2 is a Si substrate, and the first insulating film 3 and the second insulating film 4 are silicon dioxide films ($SiO_2$ films). SiN, $Al_2O_3$, $HfO_2$, or DLC may be used for the first insulating film 3 and the second insulating film 4.

In the configuration of the present disclosure, the first surface 16 of the vibrating plate 1 is provided with a recessed portion 18 surrounded by the bottom surface and four lateral surfaces intersecting with the bottom surface. In a case where the liquid chamber 19 is disposed in a region A and the recessed portion 18 is formed in a region B, and the two regions are projected on a surface parallel to the surfaces of the vibrating plate 1, the region B is contained in the region A. In other words, the recessed portion 18 is arranged in a region overlapping with the liquid chamber 19 when viewed from a direction perpendicular to the vibrating plate 1.

Figure 4:
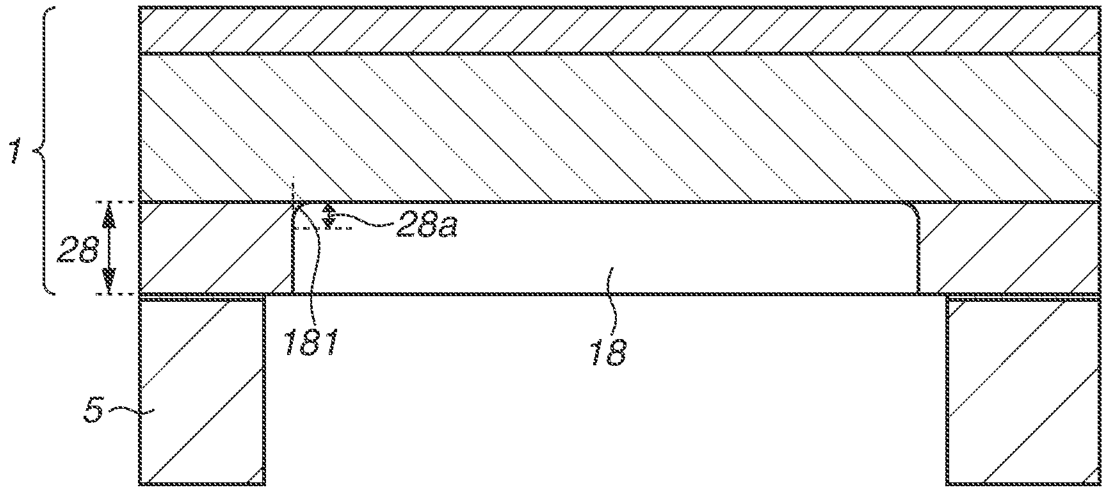
FIG. 4 is a cross-sectional view illustrating an example of a recessed portion in the liquid discharge head of the present disclosure.

A recessed portion depth 28 is substantially constant over the entire recessed portion 18. Accordingly, a vibration characteristic of the vibrating plate 1 is more uniform than when the recess depth is not constant. In FIGS. 3B and 3C, the recessed portion 18 penetrates through the second insulating film 4 (first layer). In addition to the first layer having the first surface 16, the recessed portion 18 may continuously penetrate through another layer adjacent to the first layer on the side opposite to the first surface 16. FIG. 4 is an enlarged view illustrating the vicinity of the recessed portion 18 in the cross-sectional view of the liquid discharge head illustrated in FIG. 3C. The bottom surface and the lateral surfaces may be connected via a curved surface 181 (hereinafter also referred to as a curved surface portion). Desirably, a depth 28*a* of a region where the curved surface 181 is disposed is 10% or less of the entire recessed portion depth 28 in the depth direction of the recessed portion 18. This means that each lateral surface has a flat surface portion not provided with a curved surface, and the curved surface portion 181, and that the depth 28*a* of the curved surface portion 181 is 10% or less of the entire recessed portion depth 28 in the depth direction. From a similar viewpoint, desirably, the curvature radius of the curved surface 181 is 10% or less of the recessed portion depth 28. The "curvature radius of a curved surface" according to the present application refers to the radius of a circle to which a sectional contour (curve) of the curved surface 181 is approximated.

A sectional shape of the curved surface 181 on the lateral surface may be the above-described circle (circular arc), or may be, for example, an ellipse.

The piezoelectric element 8 includes a first electrode 10 disposed on the surface of the vibrating plate 1 opposite to the side of the liquid chamber 19, a piezoelectric film 9 disposed on the first electrode 10, and a second electrode 11 disposed on the piezoelectric film 9.

The second electrode 11 is an individual electrode, and the first electrode 10 is a common electrode. TiW, Pt, Ru, or Jr can be used for the second electrode 11 and the first electrode 10. In the present exemplary embodiment, TiW is used for the second electrode 11 and Pt is used for the first electrode 10. Lead zirconate titanate, lead titanate, zinc oxide, or aluminum nitride can be used for the piezoelectric film 9. In the present exemplary embodiment, lead zirconate titanate is used as an example. In a case where lead zirconate titanate is used for the piezoelectric film 9, lead may scatter on neighboring films because the piezoelectric film 9 is sintered at a high temperature in film formation. To prevent the lead from scattering, desirably, a ZrO or $TiO_2$ film is formed as a lead scattering prevention film between the first insulating film 3 and the first electrode 10. In a case where the $TiO_2$ film is used, a Ti film may be formed as a layer for improving adhesion between the first electrode 10 and the $TiO_2$ film.

On the second electrode 11, a third insulating film 12 made of $SiO_2$ is formed. Other materials, such as $Al_2O_3$ and SiN, may be used for the third insulating film 12. On the third insulating film 12, a first contact hole 29 and a second contact hole 30 are formed to connect electrical wiring to the second electrode 11 and the first electrode 10, respectively. On the third insulating film 12, an electrical wiring layer 31 made of AlCu is formed, and the contact holes 29 and 30 are filled with the electrical wiring layer 31. The electrical wiring layer 31 includes a first electrical wiring 32, a second electrical wiring 33, a first electrode pad 34, and a second electrode pad 35 (see FIG. 3A). The first electrical wiring 32 connects the second electrode 11 with the first electrode pad 34 via the first contact hole 29, and the second electrical wiring 33 connects the first electrode 10 with the second electrode pad 35 via the second contact hole 30. A Ti film may be formed between the third insulating film 12 and the electrical wiring layer 31 to improve adhesion, or a material other than AlCu may be used for the electrical wiring layer 31. The first electrode pad 34 and the second electrode pad 35 formed on the vibrating plate 1 are connected to the flexible wiring substrate 101, so that the piezoelectric element 8 can be applied with an electrical signal required for liquid discharge.

After the formation of the electrical wiring layer 31, a protection film 13 made of a SiN film may be formed on the electrical wiring layer 31 and the third insulating film 12 to maintain insulation and moisture-proof properties of the electrical wiring layer 31. $SiO_2$, $Al_2O_3$, $HfO_2$, or DLC may be used for the protection film 13. The protection film 13 may be formed only on a part of the piezoelectric element 8 and the electrical wiring layer 31. If an aqueous liquid is not used or if the electrical wiring layer 31 is not exposed to ambient air, the protection film 13 may not be formed, or the third insulating film 12 may be used as the protection film 13.

A Si substrate can be used for the liquid chamber substrate 5, the discharge port substrate 6, and the flow path substrate 7. If there is no issue in wettability with the liquid filled in the liquid chamber 19, materials such as glass and resin may be used. If an aqueous liquid is used, desirably, a surface protection layer made of SiC, $Al_2O_3$, SiN, or $SiO_2$ is formed on a surface contacting the liquid.

In the present exemplary embodiment, the vibrating plate 1, the piezoelectric element 8, and the liquid chamber substrate 5 are collectively referred to as a piezoelectric structure 37. While, in the present exemplary embodiment, the vibrating plate 1 and the liquid chamber substrate 5 are different substrates, the piezoelectric structure 37 may be formed by processing one substrate. The above-described structure of the discharge element 110 including the piezoelectric structure 37 can be formed into a desired structure by repeatedly performing resist application, photolithographic patterning, and etching.

Liquid discharge from the discharge element 110 will now be described. Connecting the supply port 21 and the discharge port 22 arranged on the flow path substrate 7 with the external liquid circulation unit 504 via different common flow paths (not illustrated) enables liquid supply to the discharge element 110 and the liquid discharge therefrom. The liquid discharge from the discharge port 20 is enabled by applying a voltage to the piezoelectric element 8 to vibrate the vibrating plate 1 in a state where the liquid chamber 19 is filled with a liquid. The liquid supplied from the liquid circulation unit 504 passes through a common supply flow path (not illustrated) and then is supplied through the supply port 21 to each of the liquid chambers 19. The liquid carried to each of the liquid chambers 19 passes through a common discharge flow path (not illustrated) through the discharge port 22, and then is collected to the liquid circulation unit 504. When the liquid is suctioned from the side of the discharge ports 20 of the discharge port substrate 6, the liquid in the liquid chamber 19 moves to the discharge port 20. When suction of the liquid is stopped, a meniscus is formed on the discharge port 20 by surface tension of the liquid. In this state, if the piezoelectric element 8 is driven while there is a potential difference between the first electrode 10 and the second electrode 11, the vibrating plate 1 is deformed to be warped toward a direction of the liquid chamber 19 to change the inner volume of the liquid chamber 19. A pressure generated by a change in the inner volume causes the liquid to be discharged from the discharge ports 20. After the liquid discharge, the deformation of the vibrating plate 1 is restored to a former state, and the meniscus is formed on the discharge port 20 again. The drive of the piezoelectric element 8 can be controlled based on a direction and magnitude of the voltage to be applied, making it possible to change the discharge amount and discharge speed of the liquid. For example, when the vibrating plate 1 is deformed in a direction in which the inner volume of the liquid chamber 19 increases, and then deformed in a direction in which the inner volume of the liquid chamber 19 decreases, the pressure generated by the change in the inner volume increases to increase the discharge amount and discharge speed of the liquid.

While the discharge amount and discharge speed can be increased by increasing the voltage to be applied, there is an upper limit to the applicable voltage because of characteristics of the apparatus 700 and the piezoelectric film 9. Thus, desirably, the piezoelectric structure 37 is configured so that a large deformation is obtained with a low voltage. To evaluate performance of the piezoelectric structure 37, an inner volume change amount per unit voltage (=volume change amount [$m^3$/V]) of the liquid chamber 19 is used as an index for the voltage and the deformation amount. In addition, desirably, the force generated by the voltage application to the piezoelectric element 8 is converted into the deformation of the vibrating plate 1 as much as possible. If the vibrating plate 1 is flexible, efficiency of the conversion of the force generated by the piezoelectric element 8 into the deformation of the vibrating plate 1 decreases, making it difficult to change the inner volume of the liquid chamber 19. Thus, the inner volume change amount of the liquid chamber 19 per unit pressure (=compliance [$m^3$/Pa]) is used as an index for the pressure and the deformation amount. In the configuration of the piezoelectric structure 37, having high liquid discharging performance, a small compliance and a large volume change amount are desirable. With (volume change amount/compliance) defined as the "conversion efficiency", the performance of the piezoelectric structure 37 can be evaluated.

A relation between the structure of the recessed portion 18 and the conversion efficiency will now be described. As described above, when viewed from the direction perpendicular to the vibrating plate 1, the recessed portion 18 of the present disclosure is arranged in a region overlapping with the liquid chamber 19.

Figure 5:
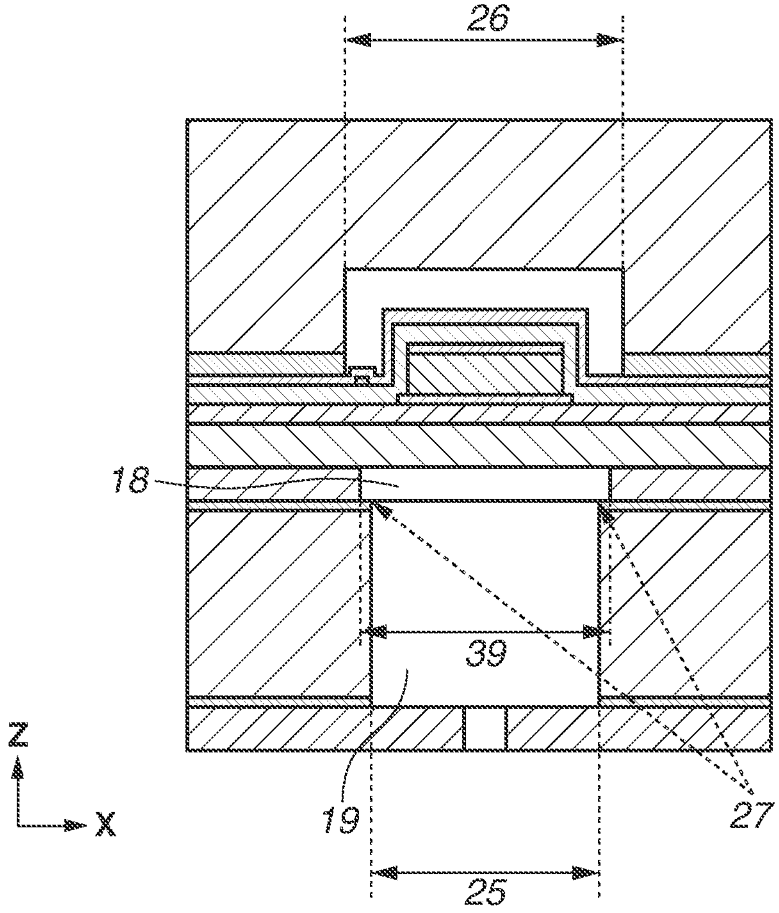
FIG. 5 is a cross-sectional view illustrating a liquid discharge head according to a comparative example.

As illustrated in FIG. 3C, a recessed portion width 39 is smaller than the liquid chamber width 25 in the shorter side direction of the liquid chamber 19. If the recessed portion width 39 is smaller than the liquid chamber width 25, a part of the vibrating plate 1 where the recessed portion 18 is arranged becomes thin, and thus the inner volume change amount per unit voltage (=volume change amount [$m^3$/V]) increases. On the other hand, the thickness of a part of the vibrating plate 1 where the recessed portion 18 is not arranged remains the same, and thus the inner volume change amount per unit pressure (=Compliance [$m^3$/Pa]) generated by the piezoelectric element 8 and the vibrating plate 1 can be decreased. This makes it possible to improve the conversion efficiency. If the recessed portion width 39 and the liquid chamber width 25 are the same in size or if the recessed portion width 39 is larger than the liquid chamber width 25 as illustrated in FIG. 5, the thickness of the vibrating plate 1 as a whole is decreased, so that the vibrating plate 1 is flexible. In this case, with an increase in the volume change amount, the compliance increases and the conversion efficiency decreases. Desirably, the recessed portion width 39 is 50% or more and 130% or less of a piezoelectric film width 41. Likewise, desirably, a recessed portion length 38 is 50% or more and 120% or less of the piezoelectric film length 42 in the longer side direction of the liquid chamber 19. The deformation of the vibrating plate 1 is maximized at the center of the region where the vibrating plate 1 overlaps with the liquid chamber 19 in the planar view. Thus, desirably, the vibrating plate 1 is easily deformed if the center of the recessed portion 18 is positioned at the approximate center of the liquid chamber 19 (space). The deformation of the vibrating plate 1 is maximized at the center of the piezoelectric film 9 in the planar view. Thus, desirably, the vibrating plate 1 is easily deformed if the piezoelectric film 9 at least partly overlaps with the recessed portion 18 in the planar view. Further, the vibrating plate 1 is easily deformed if the approximate center of the recessed portion 18 is positioned at the approximate center of the piezoelectric film 9. The "approximate center" according to the present disclosure includes a position slightly deviated from the center within a range where an effect of the present disclosure can be obtained. The configuration of the present disclosure includes a recessed portion on the vibrating plate as a method for decreasing the thickness of the piezoelectric structure including the piezoelectric element, so that the vibrating plate is easily deformed. In the configuration of the present disclosure, desirably, the resistance to peeling of the piezoelectric film and the electrical reliability are easily maintained in comparison with the configuration where a recessed portion is provided on the protection film and the insulating film on the piezoelectric element (piezoelectric film).

Desirably, the recessed portion length 38 is smaller than the space length 24 in the longer side direction of the liquid chamber 19. Since the recessed portion length 38 is smaller than the space length 24, the volume change amount can be increased while an increase in the compliance is prevented, thus the conversion efficiency can be improved. In the present exemplary embodiment, desirably, the recessed portion length 38 is 50% or more and 100% or less of the space length 24.

Desirably, the recessed portion width 39 is larger than the piezoelectric film width 41, and is 50% or more and 80% or less of a space width 26 in the shorter side direction of the liquid chamber 19. In a case where the vibrating plate 1 has a rectangular shape as in the present exemplary embodiment, the deformation of the vibrating plate 1 will change depending on the width of the vibrating plate 1 when an aspect ratio of the rectangular shape is larger than or equal to a predetermined value. For example, the change of the maximum deformation when a uniformly distributed load acts on the surface of a simply supported rectangular plate decreases when an aspect ratio is of approximately 3 or larger, and thus an effect of the length in the longer side direction of the vibrating plate 1 on the deformation of the vibrating plate 1 decreases. Thus, if the recessed portion width 39 is larger than the piezoelectric film width 41 and smaller than the liquid chamber width 25, vibration efficiency may remain unchanged even if the recessed portion length 38 is changed. In such a case, desirably, the recessed portion length 38 is 50% or more and 80% or less of the space length 24, and does not need to be increased more than necessary.

The recessed portion depth 28 only needs to be a desired depth, and the thickness of the vibrating plate 1 and the recessed portion depth 28 may be determined so that the resonance frequency of the piezoelectric structure 37 becomes a desired value. The thickness of each component refers to the thickness in the direction perpendicular to the vibrating plate 1, i.e., in the Z direction in the drawings. For example, in the vibrating plate 1 including three layers, i.e., the substrate 2, the first insulating film 3, and the second insulating film 4, the substrate 2 is 2 μm thick, the first insulating film 3 is 0.5 μm thick, and the second insulating film 4 is 1 μm thick. In this case, desirably, if the thickness of the second insulating film 4 is 1 μm, which equals the thickness of the recessed portion depth 28, processing becomes easy.

Figure 6A:
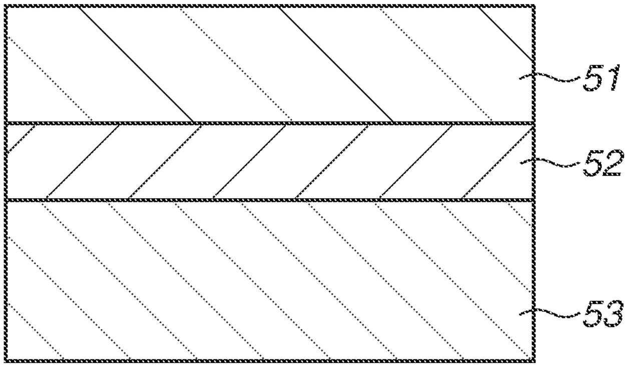
FIGS. 6A to 6D illustrate an example of a recessed portion forming process in the liquid discharge head of the present disclosure.
Figure 6B:
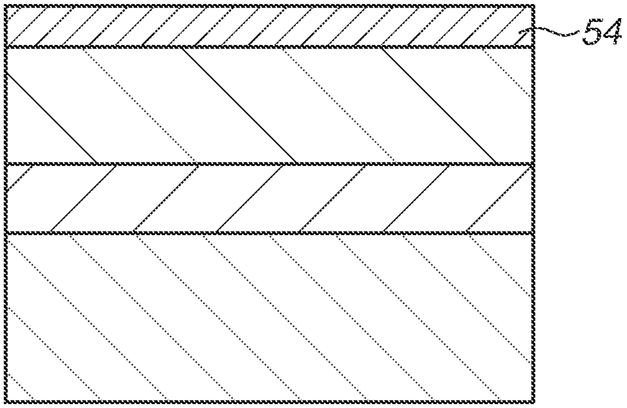
Figure 6C:
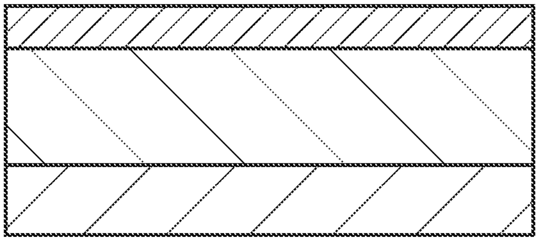
Figure 6D:
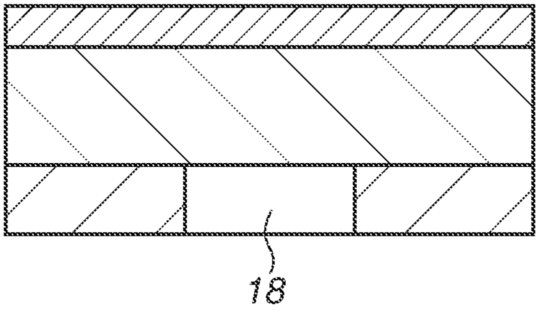

Subsequently, an example of a process for forming the recessed portion 18 will be described. FIGS. 6A to 6D illustrate the process for forming the recessed portion 18 by using a silicon on insulator (SOI) substrate to form the vibrating plate 1 having the recessed portion 18. First, an SOI substrate including a Si layer 53 to be used as a handling layer, a buried oxide (BOX) layer 52 made of $SiO_2$ and formed on the Si layer 53, and a Si layer 51 formed on the BOX layer 52 is prepared (FIG. 6A). For example, the BOX layer 52 serving as the second insulating film 4 is 1 μm thick, and the Si layer 51 serving as the vibrating plate substrate 2 is 2 μm thick. A $SiO_2$ layer 54 that is 0.5 μm in thickness is formed on the Si layer 51 serving as the vibrating plate substrate 2 to form the first insulating film 3 that is 0.5 μm in thickness (FIG. 6B). Then, the handling layer (Si layer 53) is removed (FIG. 6C), and the BOX layer 52 is partly removed by use of the Si layer 51 (substrate 2) as a stop layer (FIG. 6D). Accordingly, the recessed portion depth 28 of a 1 μm thickness is obtained, and the recessed portion 18 according to the present exemplary embodiment is obtained. As described above, the recessed portion 18 is formed by etching so that the recessed portion 18 penetrates through the BOX layer 52 by use of the Si layer 51 (substrate 2) as a stop layer. Accordingly, an effect that the depth of the recessed portion can be easily controlled to a desired value is obtained. While, desirably, the patterning of the BOX layer 52 is performed by dry etching, the patterning may be performed by wet etching. After the patterning of the BOX layer 52, the second insulating film 4 may be formed on the side of the recessed portion 18. After the removal of the BOX layer 52, the Si layer 51 (substrate 2) may be further removed so that the recessed portion 18 further penetrates through the Si layer 51 on the bottom surface of the recessed portion 18, to make the recessed portion depth 28 larger than the thickness of the BOX layer 52. In this case, making the recessed portion depth 28 as large as the sum of the thickness of the BOX layer 52 and the thickness of the Si layer 51, an effect that the depth of the recessed portion can be easily controlled to a desired value is obtained. Since the piezoelectric structure 37 generally requires rigidity to some extent to mount the piezoelectric element 8 on the vibrating plate 1, desirably, the recessed portion depth 28 is several hundred nanometers to several micrometers. In manufacturing a liquid discharge head of the present disclosure, after forming the recessed portion 18 as described above, the liquid chamber substrate 5 with the liquid chamber 19 formed thereon is bonded to the surface (first surface 16) with the recessed portion 18 of the vibrating plate 1 formed thereon.

Figure 7A:
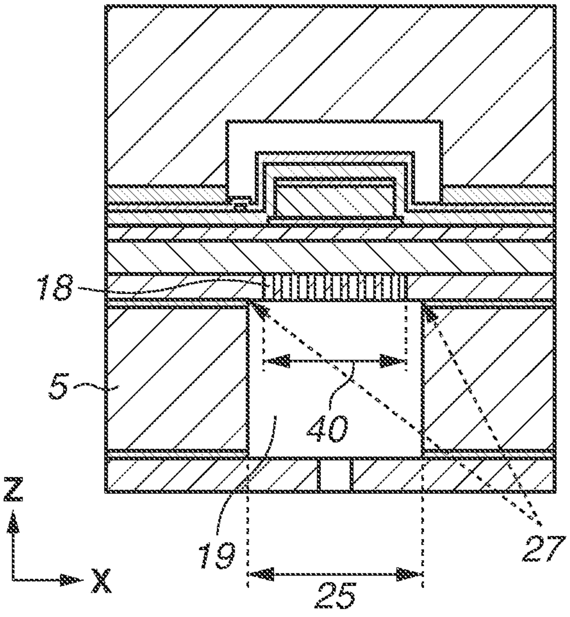
FIGS. 7A and 7B are cross-sectional views illustrating examples of the liquid discharge head of the present disclosure.
Figure 7B:
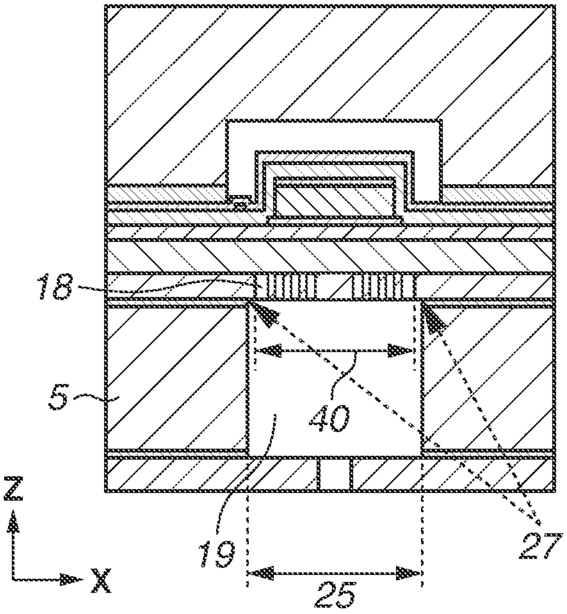
Figure 7C:
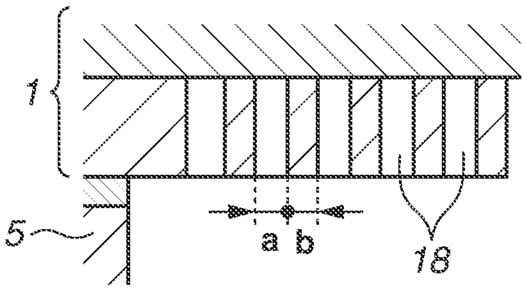
FIG. 7C is an enlarged view illustrating a part of FIGS. 7A and 7B.

A plurality of recessed portions 18 may be formed. FIGS. 7A to 7C illustrate the liquid discharge head provided with the plurality of recessed portions 18. FIG. 7C is an enlarged view illustrating a part of the vibrating plate 1 and some of the recessed portions 18 illustrated in the cross-sectional views in the shorter side direction of the liquid chamber 19 in FIGS. 7A and 7B. In a case where the plurality of recessed portions 18 is provided, desirably, a width 40 of a region in which the plurality of recessed portions 18 is provided is smaller than the liquid chamber width 25. Accordingly, the volume change amount is increased while an increase in the compliance is suppressed, thus the conversion efficiency of the vibrating plate 1 is improved. Desirably, the plurality of recessed portions 18 each has a shape extending in the longer side direction of the liquid chamber 19 and is arranged in the shorter side direction thereof (X direction) in FIG. 7C. In this case, the vibrating plate 1 is easily deformed in the Z direction. In a case where the plurality of recessed portions 18 is arranged, a width a of each recessed portion 18 may be a desired width, i.e., desirably, the width a may be several micrometers to several tens of micrometers from the viewpoint of patterning accuracy. As illustrated in FIG. 7B, it is not necessary that all the widths a of the recessed portions 18 and pitches b between the recessed portions 18 in the X direction illustrated in FIG. 7C be the same size.

Providing the plurality of recessed portions 18 can change the surface condition on the side of the first surface 16 of the vibrating plate 1. For example, if the second insulating film 4 is an oxide film on which unevenness due to the plurality of recessed portions 18 exists, the wettability is improved, which is desirable for liquid circulation in the liquid discharge head. If the second insulating film 4 is not provided and the plurality of recessed portions 18 is provided on the substrate 2 made of hydrophobic silicon, water-repellent effect of the first surface 16 of the vibrating plate 1 is improved due to an uneven structure, which is desirable because air bubbles are prevented from remaining on the first surface 16.

The above-described basic configuration according to the present exemplary embodiment increases the volume change amount while suppressing an increase in the compliance, thus improving the conversion efficiency of the vibrating plate 1.

The present exemplary embodiment has been described above centering on the liquid discharge head configured to circulate a liquid from the supply port 21 to the discharge port 22 via the liquid chamber 19. However, the liquid discharge head may be configured to supply a liquid from both the supply port 21 and the discharge port 22 or configured to include only the supply port 21 and no discharge port 22. In either case, an effect of improving the conversion efficiency of the vibrating plate 1 can be obtained.

EXAMPLES

The present exemplary embodiment will be described below centering on the conversion efficiency of the liquid discharge head configured as illustrated in FIGS. 3A to 3C, 5, 7A to 7C, and 8. Table 1 illustrates a result of comparison of conversion efficiencies in respective configurations with the same resonance frequency of the piezoelectric structure 37. To compare the conversion efficiencies with equal performance, the liquid chamber width 25 was adjusted to provide the same resonance frequency in the respective configurations.

First Example

In a first example, the liquid discharge head including the discharge elements 110 having the configuration of the present disclosure illustrated in FIGS. 3A to 3C is manufactured. The vibrating plate 1 includes a Si substrate with a 2 μm thickness as the vibrating plate substrate 2, a $SiO_2$ layer with a 0.5 μm thickness as the first insulating film 3, and a $SiO_2$ layer with a 1 μm thickness as the second insulating film 4. The piezoelectric element 8 is composed of a TiW layer with a 0.1 μm thickness as the second electrode 11, a Pt layer with a 0.13 μm thickness as the first electrode 10, and a lead zirconate titanate layer with a 2 μm thickness as the piezoelectric film 9. The piezoelectric film width 41 is 94 μm thick, and the piezoelectric film length 42 is 639 μm thick. A $TiO_2$ layer with a 0.01 μm thickness and a Ti layer with a 0.01 μm thickness were formed in this order from the side of the first insulating film 3 between the first electrode 10 and the first insulating film 3. On the second electrode 11, an $Al_2O_3$ layer with a 0.04 μm thickness was formed to cover the piezoelectric element 8. On the $Al_2O_3$ layer, a $SiO_2$ layer with a 0.4 μm thickness and a Ti layer with a 0.01 μm thickness were formed as the third insulating film 12, a AlCu layer with a 0.7 μm thickness was formed as the electrical wiring layer 31, and a SiN layer with a 0.2 μm thickness was formed as the protection film 13. The flow path substrate 7, which is a Si substrate with a 400 μm thickness, has the supply port 21 and the discharge port 22 each with an 80 μm*80 μm size, the space width 26 with a 148 μm width, and the space length 24 with a 700 μm length. The liquid chamber substrate 5, which is a Si substrate with a 90 μm thickness, has the liquid chamber length 23 with a 960 μm length, and the liquid chamber width 25 with a 125 μm width. The discharge port substrate 6, which is a Si substrate with 20 μm thickness, has the discharge port 20 with a 20 μm diameter. The vibrating plate 1 further has the recessed portion 18 on the first surface 16. The recessed portion width 39 is 115 μm, and the recessed portion length 38 is 690 μm. Since the vibrating plate 1 vibrates in a region surrounded by the fixed ends 27, the recessed portion 18 was formed so that the center of the recessed portion 18 coincides with the approximate center of the region surrounded by the fixed ends 27. In this case, the approximate center of the liquid chamber 19 coincides with the center of the recessed portion 18 in the planar view. The resonance frequency, the volume change amount, and the compliance of the discharge element 110 configured as above were calculated. The calculation was performed by using simulation software (Ansys Mechanical Enterprise from Cybernet Systems Co., Ltd.). In the calculation of the resonance frequency, static analysis was performed by applying a 1 V potential difference between the second electrode 11 and the first electrode 10 in the piezoelectric element 8. As a result, a value of 1.23 megahertz (MHz) was obtained. In the calculation of the volume change amount, static analysis was performed by applying a 0 V potential difference and a 30 V potential difference between the second electrode 11 and the first electrode 10 in the piezoelectric element 8. An amount of change between the inner volume in the liquid chamber 19 with 0 V application and the inner volume therein with 30 V application as an output was calculated. Then, the amount of change was divided by the applied voltage to obtain the volume change amount. As a result, a value $8.28*10^{-16}$ ($m^3$/V) was obtained as the volume change amount. In the calculation of the compliance, static analysis was performed by applying a 1 MPa pressure to the region surrounded by the fixed ends 27. The amount of change between of the inner volume in the liquid chamber 19 with 0 V application and the inner volume therein with 1 MPa application as an output was calculated. Then, the amount of change was divided by the applied pressure to obtain the compliance. As a result, a value $3.24*10^{-20}$ ($m^3$/Pa) was obtained as the compliance. Based on the above-described results, a value $2.55*10^4$ (Pa/V) was obtained as the conversion efficiency.

Second Example

In a second example, the liquid discharge head including the discharge elements 110 having the configuration in which a plurality of recessed portions 18 is provided illustrated in FIG. 7A is manufactured. In the present configuration, the width 40 of the region with the plurality of recessed portions 18 formed thereon is smaller than the liquid chamber width 25. The liquid chamber width 25 is 123 μm, the width 40 of the region with the plurality of recessed portions 18 formed thereon is 113 μm, and the recessed portion length 38 is 690 μm. A recessed width a is 6 μm, and a recessed pitch b is 6 μm. The recessed portions 18 were formed to be evenly arranged in the X direction with respect to the center of the liquid chamber width 25, and the center of a region where the plurality of recessed portions 18 is formed coincides with the approximate center of the region surrounded by the fixed ends 27. Other constituent elements are similar to those in the first example. The resonance frequency, the volume change amount, and the compliance of the discharge element 110 configured as above were calculated by using a method similar to that in the first example. As a result, a resonance frequency of 1.23 MHz, a volume change amount of $7.24*10^{-16}$ ($m^3$/V), a compliance of $2.84*10^{-20}$ ($m^3$/Pa), and a conversion efficiency of $2.55*10^4$ (Pa/V) were obtained.

Third Example

In a third example, the liquid discharge head including the discharge elements 110 having the configuration in which the plurality of recessed portions 18 is provided illustrated in FIG. 7B is manufactured. In the present configuration, the width 40 of the region with the plurality of recessed portions 18 formed thereon is smaller than the liquid chamber width 25. Further, unlike in the second example, recessed widths a are not the same in size and recessed pitches b are not the same in size. The liquid chamber width 25 is 124 μm, the width 40 of the region where the recessed portion 18 is provided is 114 μm, and the recessed portion length 38 in the longer side direction of the liquid chamber 19 is 690 μm. The plurality of recessed portions 18 was symmetrically formed in the X direction with respect to the center of the liquid chamber width 25. The recessed portion width a is 6 μm, a largest pitch b between the recessed portions 18 positioned at the center of the liquid chamber width 25 is 30 μm, and other smaller pitches b between the recessed portions 18 are 6 μm. Other constituent elements are similar to those in the first example. The resonance frequency, the volume change amount, and the compliance of the discharge element 110 configured as above were calculated by using a method similar to that in the first example. As a result, a resonance frequency of 1.23 MHz, a volume change amount of $7.85*10^{-16}$ ($m^3/V$), a compliance of $3.01*10^{-20}$ ($m^3/Pa$), and a conversion efficiency of $2.52*10^4$ (Pa/V) were obtained.

First Comparative Example

Figure 8:
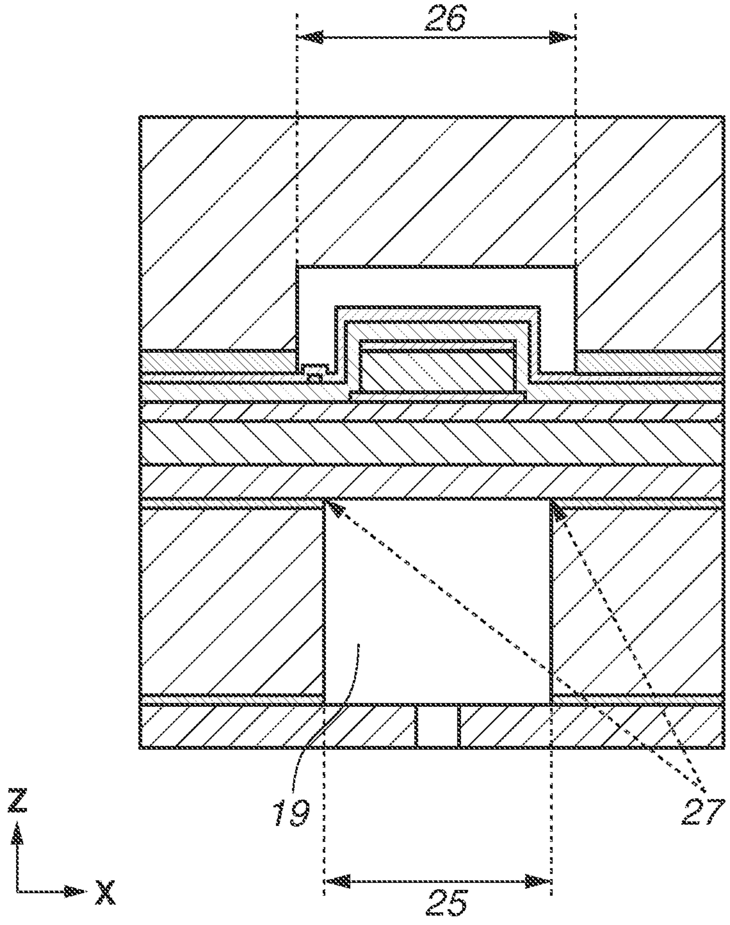
FIG. 8 is a cross-sectional view illustrating the liquid discharge head according to a comparative example.

In a first comparative example, the liquid discharge head having the configuration illustrated in FIG. 8 is manufactured. The configuration illustrated in FIG. 8 differs from the configuration illustrated in FIGS. 3A to 3C in that the recessed portions 18 are not provided. The liquid chamber width 25 is 127 μm. Other constituent elements are similar to those in the first example. The resonance frequency, the volume change amount, and the compliance of the discharge element 110 configured as above were calculated by using a method similar to that in the first example. As a result, a resonance frequency of 1.23 MHz, a volume change amount of $8.50*10^{-16}$ ($m^3/V$), a compliance of $3.38*10^{20}$ ($m^3/Pa$), and a conversion efficiency of $2.51*10^4$ (Pa/V) were obtained.

Second Comparative Example

In a second comparative example, the liquid discharge head including the discharge elements 110 having the configuration that simulates a prior example illustrated in FIG. 5 is manufactured. As illustrated in FIG. 5, the recessed portion width 39 is larger than the liquid chamber width 25, and the recessed portion length 38 is larger than the space length 24. More specifically, the recessed portion 18 overlaps with the liquid chamber 19 and is wider than the liquid chamber 19 in the planar view. The liquid chamber width 25 is 116 μm, the recessed portion width 39 is 120 μm, and the recessed portion length 38 is 704 μm. Other constituent elements are similar to those in the first example. The resonance frequency, the volume change amount, and the compliance of the discharge element 110 configured as above were calculated by using a method similar to that in the first example. As a result, a resonance frequency of 1.23 MHz, a volume change amount of $8.31*10^{-16}$ ($m^3/V$), a compliance of $3.46*10^{-20}$ ($m^3/Pa$), and a conversion efficiency of $2.40*10^4$ (Pa/V) were obtained.

Comparison Between Examples and Comparative Examples

TABLE 1

| | Drawing | Ratio of conversion efficiency to first comparative example | Liquid chamber width [μm] | Resonant frequency [MHz] |
|---|---|---|---|---|
| First comparative example | FIG. 8 | 1.00 | 127 | 1.23 |
| Second comparative example | FIG. 5 | 0.96 | 116 | 1.23 |
| First example | FIGS. 3A to 3C | 1.02 | 125 | 1.23 |
| Second example | FIG. 7A | 1.02 | 123 | 1.23 |
| Third example | FIG. 7B | 1.00 | 124 | 1.23 |

Table 1 illustrates the result of calculating ratios of the conversion efficiencies in the first, second, and third examples and the second comparative example to the conversion efficiency according to the first comparative example not having the recessed portions 18. In the first and second examples, the conversion efficiencies improved in comparison with that of the first comparative example. In this case, in the first and second examples, the same discharge force can be obtained with a smaller liquid chamber than that in the first comparative example, and thus the liquid chamber width 25 can be decreased. While the conversion efficiency in the third example is the same as that in the first comparative example, a resonance frequency equivalent to that in the first comparative example was obtained with the smaller liquid chamber width 25. If the liquid chamber width 25 is decreased, a space for wiring between adjacent discharge elements 110 is increased, so that the wiring resistance is reduced and the performance and electrical reliability of the discharge element 110 are improved. Further, if the liquid chamber width 25 and the space between the discharge elements 110 are decreased, the piezoelectric device 111 in the liquid discharge head 100 can be configured to be suitable for the high density configuration.

On the other hand, as in the second comparative example, in the configuration including the recessed portion 18, if the recessed portion width 39 and the recessed portion length 38 are larger than the liquid chamber width 25 and the space length 24, respectively, the conversion efficiency was lower than that in the first comparative example without the recessed portion 18. In the configuration of the second comparative example illustrated in FIG. 5, since the vibrating plate 1 is flexible, the compliance increases too much with respect to the volume change amount of the vibrating plate 1. Thus, the force generated by the piezoelectric element 8 cannot be efficiently converted into the deformation of the vibrating plate 1, possibly making it hard to change the inner volume of the liquid chamber 19.

The present disclosure provides a liquid discharge head capable of suppressing both the increase in the deformation amount and the increase in the compliance of the vibrating plate to improve the energy conversion efficiency of the vibrating plate, a method for manufacturing the liquid discharge head, and a liquid discharge apparatus.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2022-125153, filed Aug. 5, 2022, and No. 2023-083720, filed May 22, 2023, which are hereby incorporated by reference herein in their entirety.

What is claimed is:

1. A liquid discharge head comprising:

a discharge port configured to discharge a liquid;

a liquid chamber configured to communicate with the discharge port;

a vibrating plate disposed on a surface of the liquid chamber on a side facing a surface communicating with the discharge port, and including a plurality of layers stacked in a layered structure; and a piezoelectric element disposed on a second surface of the vibrating plate being a back surface of a first surface of the vibrating plate in contact with the liquid chamber, wherein the vibrating plate has a recessed portion surrounded by a bottom surface and four lateral surfaces intersecting with the bottom surface on the first surface, and wherein the recessed portion penetrates through a first layer having the first surface among the plurality of layers of the vibrating plates.

2. The liquid discharge head according to claim 1, wherein, in a case where a region A with the liquid chamber disposed thereon and a region B with the recessed portion formed thereon are projected on a surface parallel to a surface of the vibrating plate, the region B is included in the region A.

3. The liquid discharge head according to claim 1, wherein the piezoelectric element and the recessed portion are disposed so as to at least partly overlap with each other in a planar view from a direction perpendicular to the vibrating plate.

4. The liquid discharge head according to claim 1, wherein the vibrating plate includes a conductive substrate and an insulating film.

5. The liquid discharge head according to claim 4, wherein the conductive substrate is a silicon substrate, and the insulating film is a silicon dioxide film.

6. The liquid discharge head according to claim 1, wherein the first layer is an insulating film.

7. The liquid discharge head according to claim 1, wherein the first layer is an insulating film, and wherein a thickness of the insulating film equals a depth of the recessed portion in a direction perpendicular to the vibrating plate.

8. The liquid discharge head according to claim 1, further comprising a flow path substrate connected to the second surface of the vibrating plate and provided with a space covering the piezoelectric element, wherein an approximate center of the recessed portion is positioned at an approximate center of the space in a planar view from a direction perpendicular to the vibrating plate.

9. The liquid discharge head according to claim 1, wherein the piezoelectric element includes a first electrode, a piezoelectric film, and a second electrode in this order from a side of the second surface of the vibrating plate.

10. The liquid discharge head according to claim 9, wherein the liquid chamber is a substantially rectangular parallelepiped, and wherein a width of the recessed portion is 50% or more and 130% or less of a width of the piezoelectric film in a shorter side direction of the liquid chamber.

11. The liquid discharge head according to claim 9, wherein the liquid chamber is a substantially rectangular parallelepiped, and wherein a length of the recessed portion is 50% or more and 120% or less of a length of the piezoelectric film in a longer side direction of the liquid chamber.

12. The liquid discharge head according to claim 9, wherein the liquid chamber has a substantially rectangular parallelepiped shape, wherein a width of the recessed portion is larger than a width of the piezoelectric film in a shorter side direction of the liquid chamber, and wherein a length of the recessed portion is 50% or more and 80% or less of the piezoelectric film in a longer side direction of the liquid chamber.

13. The liquid discharge head according to claim 1, further comprising a flow path substrate connected to the second surface of the vibrating plate and provided with a space covering the piezoelectric element, wherein the liquid chamber has a substantially rectangular parallelepiped shape, and wherein a length of the recessed portion is 50% or more and 100% or less of a length of the space in a longer side direction of the liquid chamber.

14. The liquid discharge head according to claim 1, wherein the liquid chamber has a substantially rectangular parallelepiped shape, and wherein the recessed portion includes a plurality of recessed portions, each extending in a longer side direction of the liquid chamber, arranged in a shorter side direction of the liquid chamber.

15. The liquid discharge head according to claim 14, wherein the vibrating plate includes a substrate, and an oxide film as the first layer, and wherein the plurality of recessed portions is formed on the oxide film.

16. The liquid discharge head according to claim 1, wherein the discharge port is a first discharge port, the liquid discharge head further comprising:

a supply port configured to supply a liquid to the liquid chamber; and a second discharge port configured to discharge the liquid supplied to the liquid chamber, wherein liquid circulates between the liquid chamber and an outside of the liquid chamber.

17. A liquid discharge apparatus comprising:

a liquid discharge head, wherein the liquid discharge head includes:

a discharge port configured to discharge a liquid, a liquid chamber configured to communicate with the discharge port, a vibrating plate disposed on a surface of the liquid chamber on a side facing a surface communicating with the discharge port, and including a plurality of layers stacked in a layered structure, and a piezoelectric element disposed on a second surface of the vibrating plate being a back surface of a first surface of the vibrating plate in contact with the liquid chamber, wherein the vibrating plate has a recessed portion surrounded by a bottom surface and four lateral surfaces intersecting with the bottom surface on the first surface, and wherein the recessed portion penetrates through a first layer having the first surface among the plurality of layers of the vibrating plates.

* * * * *